Jan. 7, 1930.　　　W. S. GUBELMANN　　　1,742,527
TRANSFORMATION MECHANISM FOR CALCULATING MACHINES
Original Filed Jan. 10, 1900　　8 Sheets-Sheet 1

INVENTOR.
William S. Gubelmann

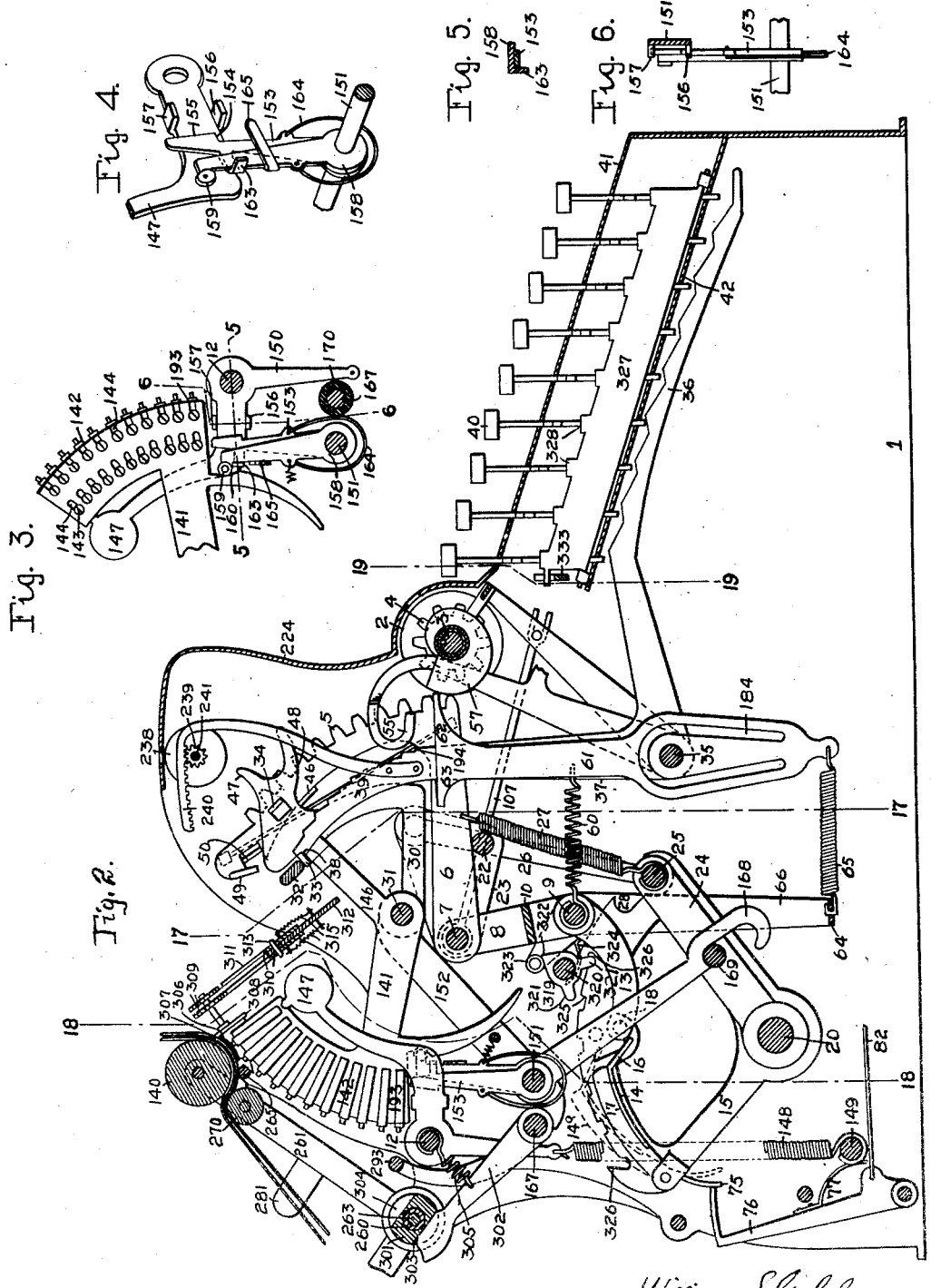

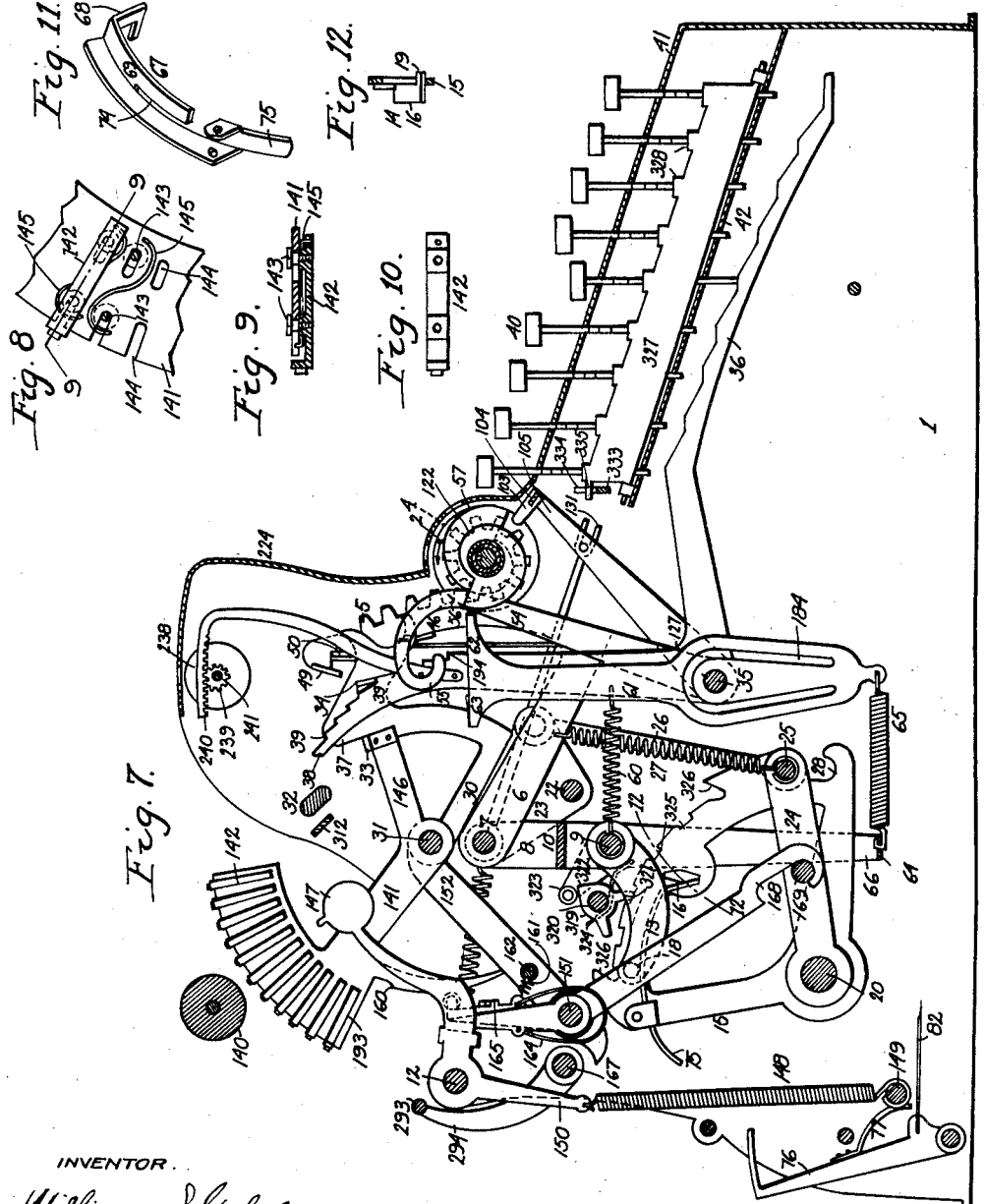

Jan. 7, 1930.  W. S. GUBELMANN  1,742,527
TRANSFORMATION MECHANISM FOR CALCULATING MACHINES
Original Filed Jan. 10, 1900   8 Sheets-Sheet 4
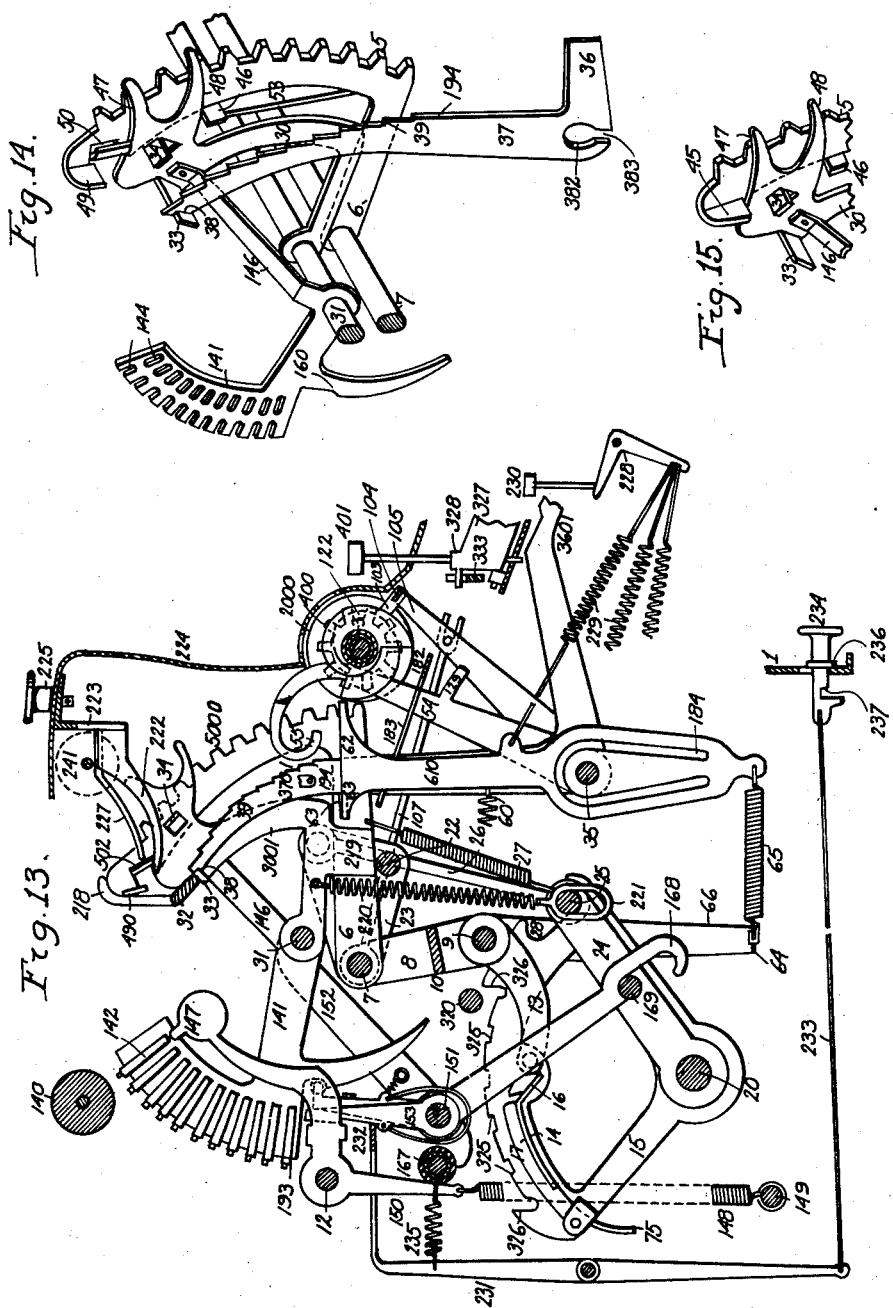
William S. Gubelmann
INVENTOR

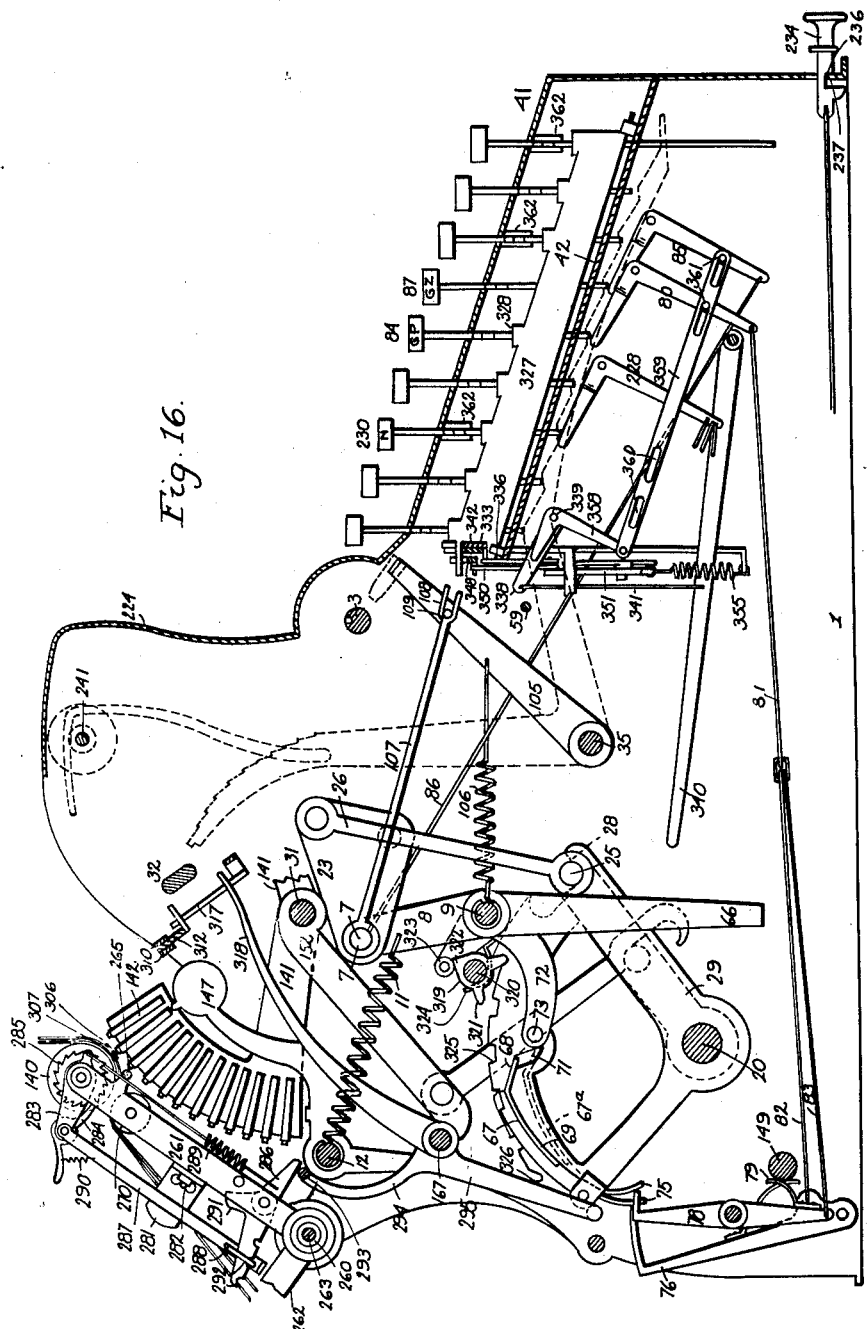

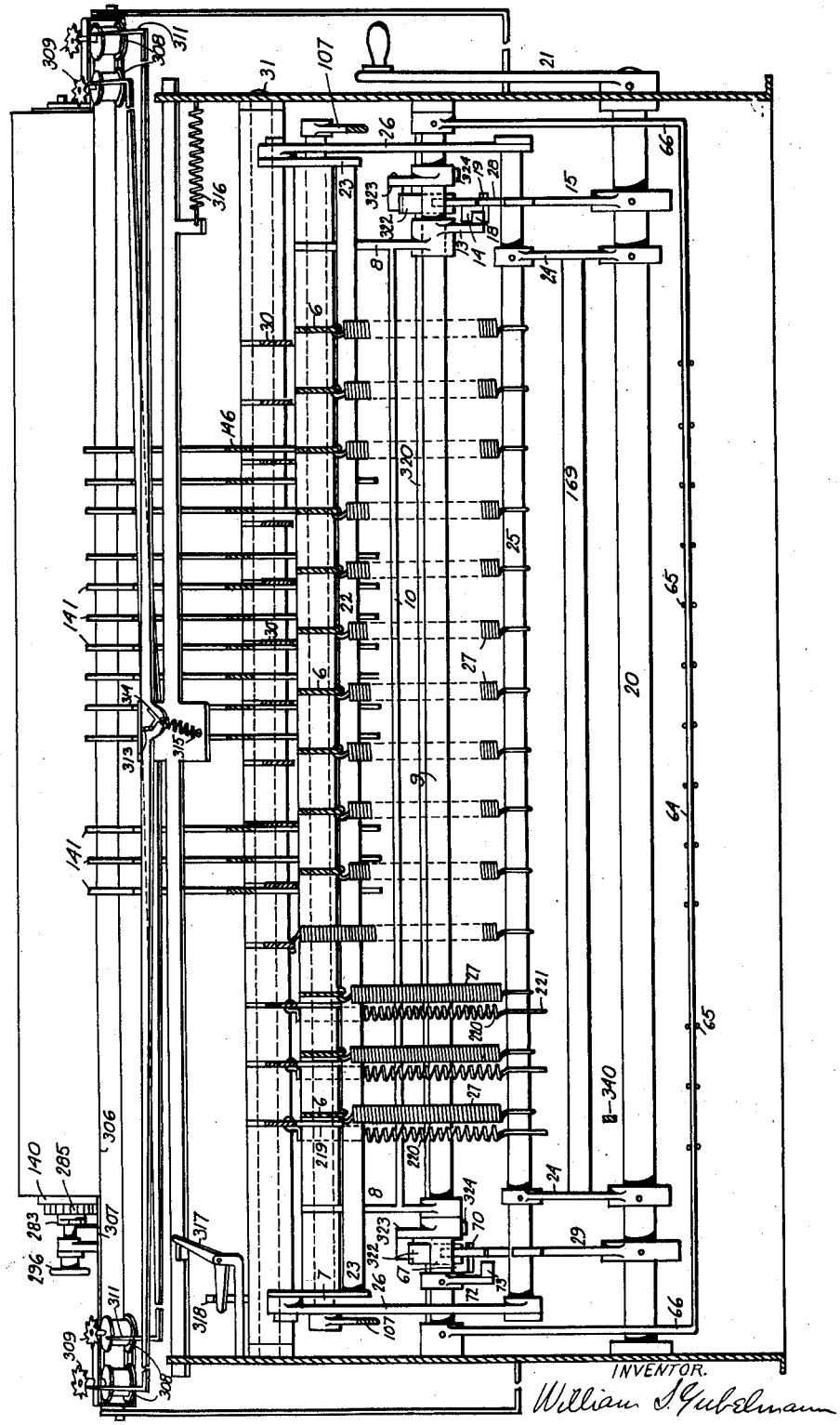

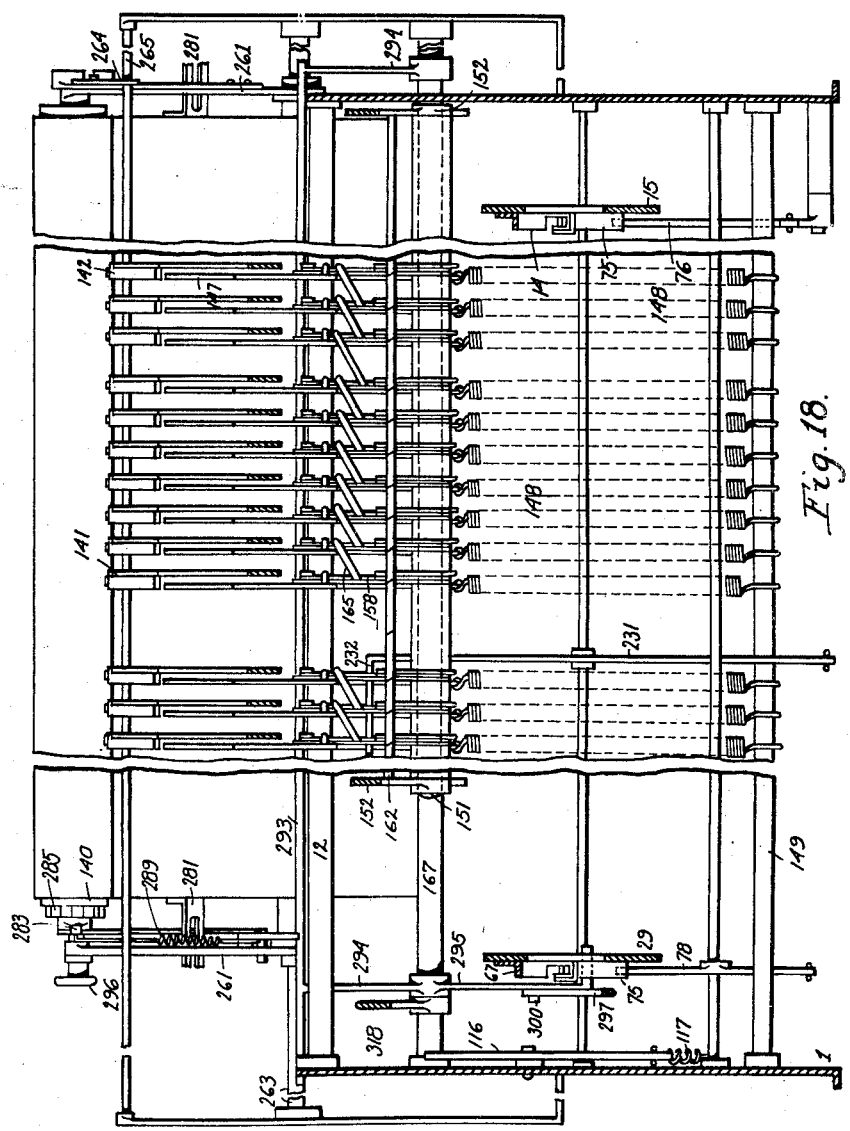

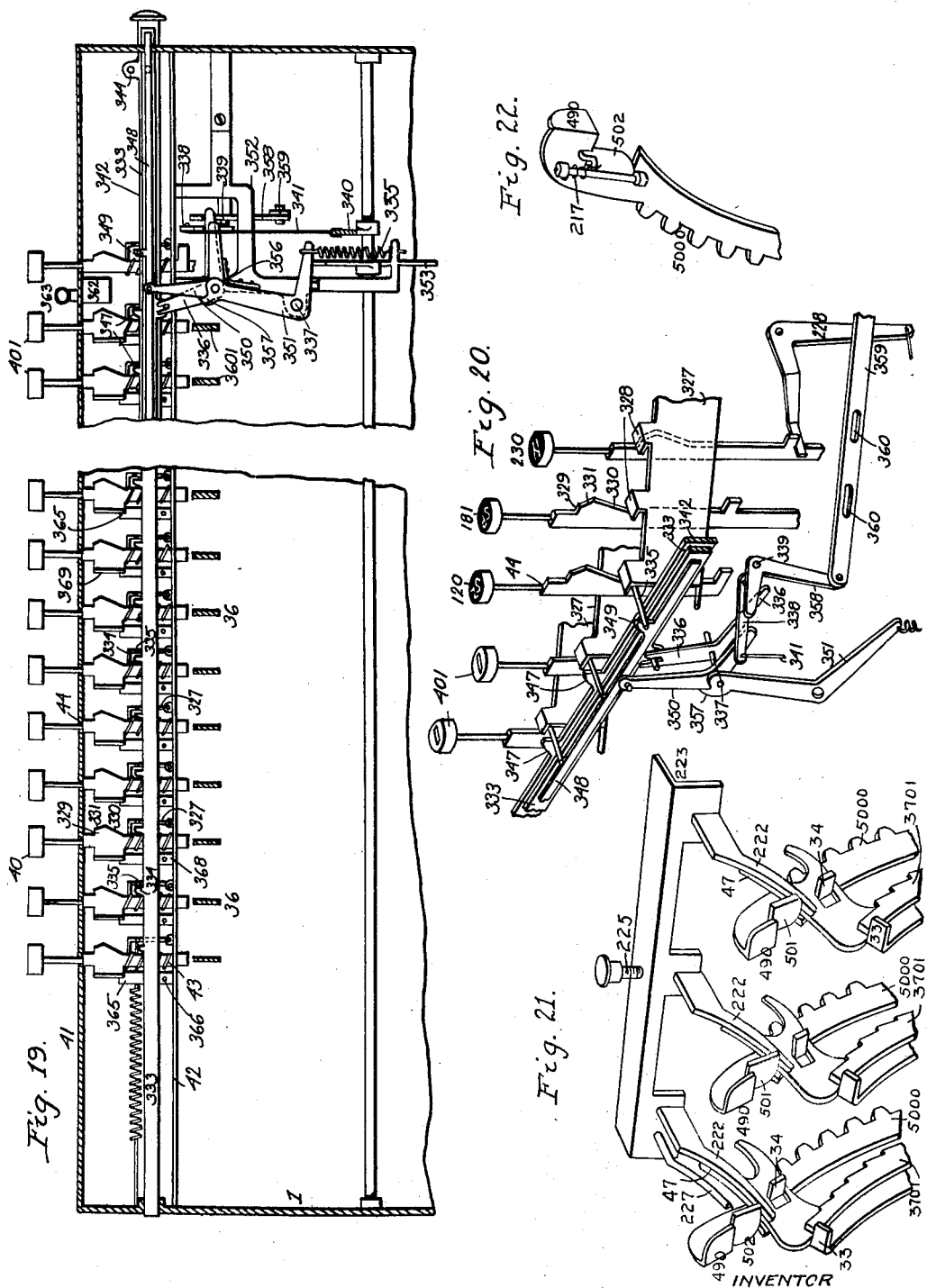

Patented Jan. 7, 1930

1,742,527

UNITED STATES PATENT OFFICE

WILLIAM S. GUBELMANN, OF BUFFALO, NEW YORK

TRANSFORMATION MECHANISM FOR CALCULATING MACHINES

Original application filed January 10, 1900, Serial No. 1,004. Divided and this application filed November 29, 1918. Serial No. 264,629.

The present invention relates to transformation mechanism for accumulating and printing mechanism of calculating machines, and is a division of my application Serial No. 1,004 filed Jan. 10, 1900, and eventuating in Patent No. 1,429,201, granted September 12, 1922.

One of the objects of the invention is to provide mechanism whereby a set of accumulators may be rendered incapable of accumulating according to the control of its key mechanism and transformed into a counting mechanism for counting the number of operations of the operating mechanism or for counting the number of printing operations of the machine or for counting the number of items accumulated on another set of accumulators.

Another object is to provide a printing mechanism which may be transformed from a key controlled mechanism for printing a list of items to an automatically controlled mechanism for printing consecutive numbers at consecutive operations of such printing mechanism.

Another object of the invention is to suppress printing by the printing mechanism associated with the accumulating mechanism which is thus transformed into counting mechanism.

These and incidental objects are attained by mechanism hereinafter described and claimed and shown in the accompanying drawings consisting of 8 sheets, in which Fig. 1 is a fragmentary top plan view of my improved adding and recording machine.

Fig. 2 is a vertical longitudinal section of the same, taken substantially in line 2—2, Figure 1, and showing the adding and recording mechanism of one column or set of keys, in the normal or inoperative position.

Fig. 3 is a fragmentary sectional elevation of the printing mechanism of one of the rows of keys viewed from the side opposite to that shown in Figure 2.

Fig. 4 is a fragmentary perspective view of the hammer operating mechanism.

Fig. 5 is a horizontal section in line 5—5, Figure 3.

Fig. 6 is a vertical section in line 6—6, Figure 3.

Fig. 7 is a view similar to Figure 2 but showing the parts of the adding and recording mechanism in operating position.

Fig. 8 is a fragmentary sectional side elevation of one of the printing segments showing the means for mounting the type movably thereon.

Fig. 9 is a cross section of the type segment taken in line 9—9, Figure 8.

Fig. 10 is a side view of one of the type carriers viewed from the side opposite to that shown in Figure 8.

Fig. 11 is a perspective view, showing one of a pair of substantially similar cams, one of which serves to shift the main dial operating segments into their operative position and the other one of which serves to shift the parts into position for printing a total of the added numbers.

Fig. 12 is a vertical section in line 12—12, Figure 7.

Fig. 13 is a fragmentary longitudinal sectional elevation taken substantially in line 13—13, Figure 1, and showing the mechanism whereby the number of adding operations of the machine are separately added and recorded.

Fig. 14 is a fragmentary perspective view showing the key lever, the main gear segment, the controller arm and the printing segment of one of the higher columns of numbers.

Fig. 15 is a fragmentary perspective view of the units controller arm and gear segment of the main adding mechanism.

Fig. 16 is a longitudinal sectional elevation taken substantially in line 16—16, Figure 1, and showing particularly the mechanism whereby different parts of the machine may be thrown into and out of gear.

Fig. 17 is a vertical section, taken substantially in line 17—17, Figure 2.

Fig. 18 is a vertical transverse section taken in line 18—18, Figure 2.

Fig. 19 is a fragmentary transverse sectional elevation taken in line 19—19, Figure 2, and showing the mechanism for holding the keys in their depressed position and for releasing the same.

Fig. 20 is a fragmentary perspective view of the key holding and releasing mechanism.

Fig. 21 is a fragmentary perspective view of the auxiliary actuating mechanism and the counting controlling slide therefor.

Fig. 22 is a fragmentary perspective view of the units gear segment of the auxiliary adding mechanism.

Like reference characters refer to like parts in the several figures.

*General adding and printing mechanism*

Figure 1:
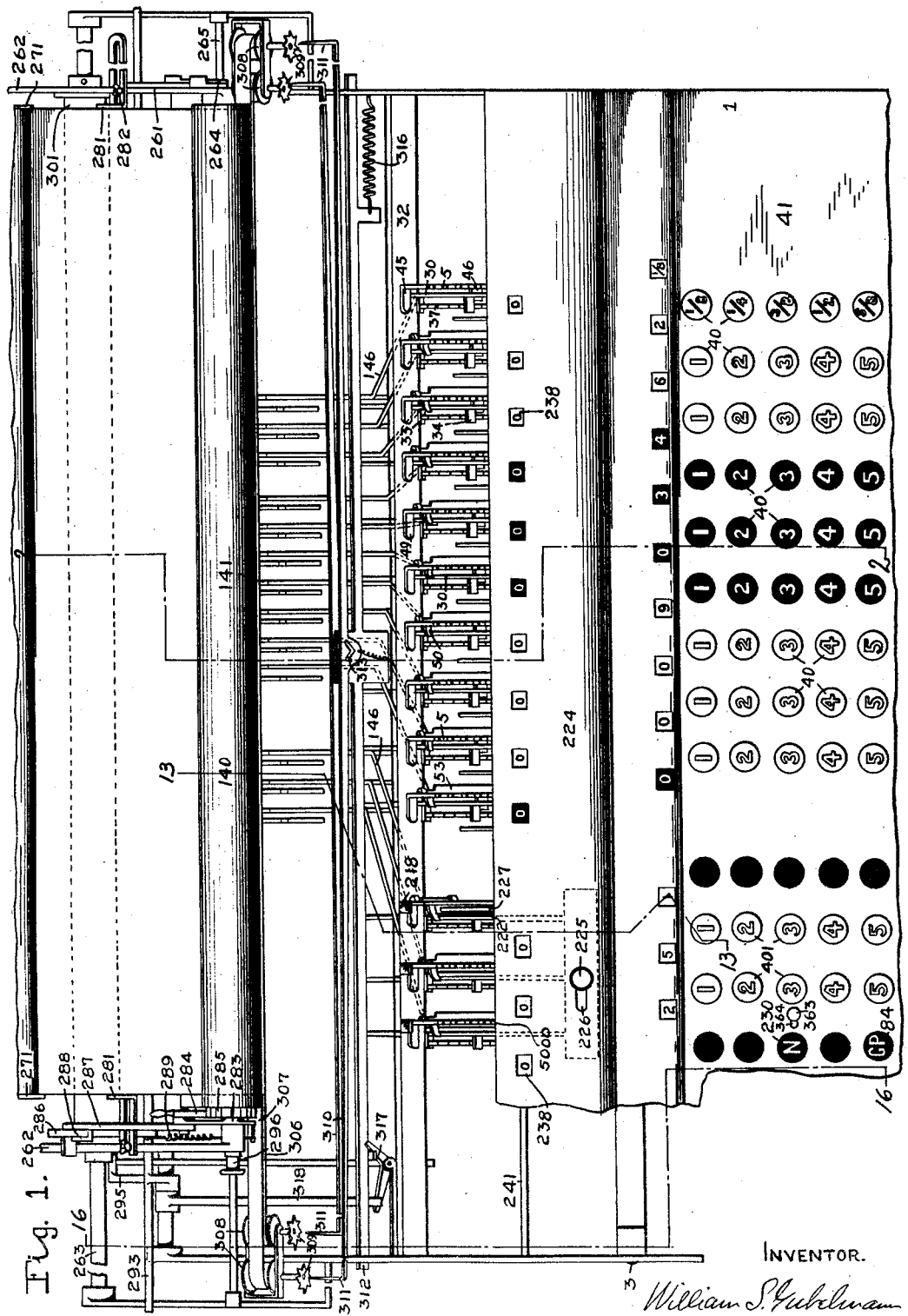

The reference numeral 40 (Figs. 1 and 2) denotes numeral keys arranged in denominational rows and depressible to set up items or amounts for entry into a series of accumulator wheels 2 (Fig. 2). Each row of numeral keys has associated therewith a key lever 36, 37, the vertical arm 37 of which is provided with a series of stop shoulders 39 and the horizontal arm 36 of which extends below the corresponding row of keys for operation by any key in said row. Also associated with each row of keys is a corresponding one of a series of controlling arms 30 pivoted on a cross rod 31 and cooperating with the related key lever 36, 37. Normally each controlling arm stands in the position shown in Fig. 2, wherein a lug 33 on said arm is engaged by shoulder 38 on the rear side of the arm 37 of the associated key lever. Upon depression of any numeral key in the corresponding row, the key lever is turned, disengaging said shoulder 38 from lug 33 of said controlling arm and bringing into the path of a lug 34 on said arm a stop shoulder 39 corresponding to the key depressed. Upon then operating the machine by drawing forwardly the operating lever 21 (Fig. 17) said controlling arm is drawn downwardly until stopped by the engagement of its lug 34 with that stop shoulder 39 that has been positioned in its path.

Connected with each controlling arm through lugs 46 and 50 is a toothed segment 5 adapted to engage and actuate a corresponding one of a series of pinions 4 attached to the respective accumulator wheels 2. The segments 5 are shiftable forwardly and rearwardly with respect to the controlling arms for engagement with and disengagement from the respective pinions 4. Also connected with each controlling arm 30 is a corresponding one of a series of type segments 141 each provided with a set of numeral type elements 142. It will thus be seen that the positions to which the actuating segments 5 and printing segments 141 are movable are controlled by the arms 30, in conjunction with the respective key levers; the latter, in turn, being settable by the numeral keys.

The operating handle 21 is secured to one end of the shaft 20 (Figs. 2, 7, and 17), to which shaft a frame 15 (Figs. 2 and 17) and a frame 29 (Figs. 7 and 17) are attached. During the initial forward rocking of said handle 21 the frame 15, through its attached cam plate 14 acting upon arm 13, rock arms 8, and rod 7, throws the actuating segments 5 into mesh with the respective accumulator pinions 4. As forward rocking of said handle 21 continues, the rear walls of notches 28 in the frames 15 and 29 come into engagement with a cross bar 25 carried by rock arms 24 loosely mounted on shaft 20, and rock said bar 25 downwardly and forwardly. Such lowering of said bar 25 moves downwardly a cross rod 22 connected thereto and underlying the segments 5, and also exerts a downward pull upon springs 27 connecting said bar 25 and said segments. Thereby, those segments 5 whose controlling arms 30 have been freed by depression of numeral keys are moved downwardly, together with their controlling arms, through extents commensurate with the setting of the key levers; and the accumulator pinions 4 are turned by said segments through corresponding extents whereby the amount set up on the key board is added to the sum formerly standing upon said wheels. Also, the segments 141 are moved with said controlling arms and bring to the printing line type corresponding to the depressed keys.

After the type segments 141 have been positioned as aforesaid, hammers 147 are actuated to drive rearwardly the respective type elements 142 that are in printing position whereby the amount set up by the numeral keys is printed on a record sheet carried by a platen 140. Operation of the hammers 147 is caused by the drawing downwardly of a bar 151 supported by arms 152 from rod 31 and carrying a series of pawls 153 (Figs. 2, 3, and 4), one for each hammer. During the setting of the printing segments to their proper positions the pawls 153 corresponding to those of the hammers 147 that should be operated for printing the item are moved into operative relation with said hammers, each of said pawls engaging a shoulder 156 on its related hammers; and upon the ensuing rocking of the bar 151 said hammers are drawn downwardly by said pawls. During such movement of said hammers an upper lug 157 (Fig. 4) on each hammer engages a trip face 155 on the associated pawl and cams the latter out of engagement with the lug 156, whereby said hammers are released and are driven rearwardly by their springs 148 to effect printing by the type elements 142 that are at the printing line. The operation of the rod 151 to cause actuation of the hammers is effected through a hook 168 connected to said rod and engageable by a cross rod 169 carried by the rock arms 24 above mentioned.

At or near the end of the forward movement of the operating handle 21, the cam 14 on frame 15 moves clear of the roller 18 on arm 13, whereupon spring 11 (Fig. 16) draws arms 8 backwardly to their position shown in Fig. 2. During the rearward or return rocking of handle 21, the shaft 20 and frames 15 and 29 rock rearwardly, the arms 24 are rocked to raise the lifting rod 22, and the actuators 5, controlling arms 30, and printing segments 141 are restored to their normal position.

For a more detailed description of the operations of accumulating and printing reference may be made to the parent case (Patent No. 1,429,201) hereinbefore referred to.

Means are provided for supporting a record sheet in the machine, line spacing the record sheet at each operation of the machine if desired, for printing upon the record sheet the numbers which are added upon the accumulator and their totals, and for disabling the printing mechanism when desired; all as fully disclosed in Patent #1,429,201.

*Auxiliary adding mechanism*

An auxiliary adding mechanism is provided which permits of registering and recording the individual or separate number of adding and recording operations which have been made by the main adding mechanism and also permits of effecting an addition of numbers different from the numbers which are added by the main adding mechanism.

This auxiliary adding mechanism is constructed as follows:

2000 (Fig. 13) represents a number of auxiliary dials which are mounted on the left hand end of the dial shaft 3. 5000 represents a number of auxiliary gear segments which are mounted on the transverse rod 7 and are adapted to engage with gear pinions 400 on the auxiliary dials. Each gear segment 5000 is connected with a controlling arm 3001 arranged adjacent to the gear segment by a latch or coupling which at times permits the segment to move independently of the controlling arm. 3601 and 3701 (see also Fig. 2) represent auxiliary key levers which are operated by auxiliary keys 401 (Fig. 1) and which control the operation of the auxiliary registering and recording mechanism. The detail construction of the dials, gear segments, printing segments, key levers and the parts co-operating therewith of the auxiliary registering and recording mechanism is substantially the same as the construction of the same parts in the main registering and recording mechanism, except as hereinafter distinguished, and the same letters of reference are therefore employed to denote like parts in both of these sets of mechanisms.

In the drawings, two auxiliary key levers and three auxiliary dials are shown, which permit of registering and recording a total of 999, but additional registering and recording devices may be employed if it is desired to increase the capacity of the machine.

In the auxiliary mechanism each of the higher gear segments 5000 is provided with a pivot latch 501 the same as in the main registering mechanism. The lowest or primary gear segment of the auxiliary registering mechanism is provided with a movable latch 502 which is adapted to be engaged with or to be disengaged from the upper guide face of its companion controlling arm. This latch is pivoted on the primary gear segment and yieldingly held in position by a spring 217, shown in Figure 22, so as to overhang the horn of its companion guide arm, as shown in Figures 13 and 21. Upon moving the latch rearwardly so as to clear the controlling arm its gear segment is permitted to drop until a stop 490 on the segment adjacent to the latch bears against the controlling arm. The extent of this drop of the primary segment independently of its controlling arm is equal to one space or number of the registering mechanism the same as in the higher auxiliary registering devices. In the auxiliary registering mechanism the gear segments are not provided with lower stops 46 like those of the gear segments of the main registering mechanism which permits the auxiliary controlling arms to move downwardly when necessary independently of the auxiliary gear segments. The upward movement of the auxiliary gear segments is limited by stops 218 with which the upper ends of the gear segments engage. 219 represents a foot formed on the lower side of each controlling arm 3001 and adapted to engage with the lifting cross bar 22.

For the purpose of effecting an ordinary addition of numbers on the auxiliary registering mechanism, the auxiliary key levers are shifted into the proper position by the depression of the keys 401 representing the numbers to be added and then the rocking segments 15 and 29 are turned forwardly. During the forward movement of the rocking frames the auxiliary gear segments are first moved into engagement with the auxiliary dial pinions by the cam 14 and then pulled down by the springs 27, and the controlling arms are also pulled down by the latches of the gear segments engaging with the controlling arms. The downward movement of the gear segments and controlling arms continues until the stops 34 of the controlling arms strike the shoulders 39 on the key levers which stand in the path of the stops 34. At the end of the forward movement of the rocking frames the gear segments are withdrawn from the dial pinions by the springs 11 and during the subsequent backward movement of the rocking frames the gear segments and controlling arms are raised by the cross bar 22 engaging with the gear segments and with the feet 219 of the arms. The carrying of numbers from the units dial to the tens dial and from the latter to the hundreds dial and the turning of the dials to zero is effected in the same manner as in the main registering mechanism.

By this organization of the machine, numbers such as sales or prices of goods can be added and recorded by the main registering mechanism, and other numbers such as the rebates on sales or discounts on the prices of the goods, can be separately added and recorded by the auxiliary registering mechanism.

The key controlled devices whereby the parts of the main registering and recording mechanism are shifted into the proper position preparatory to registering and recording a number are distinct from the key controlled devices whereby the same effect is produced in the auxiliary registering and recording mechanism, but both sets of registering and recording mechanisms are operated simultaneously by the one universal shifting mechanism for effecting the registration and recording of the numbers which are represented by the different positions of both key controlled devices.

For the purpose of permitting counting of the separate number of additions which has been effected on the main registering mechanism the auxiliary adding mechanism is constructed as follows:

220 (Fig. 13) represents springs whereby the auxiliary controlling arms are connected with the cross bar 25. The springs 220 of auxiliary controlling arms are provided at their lower ends with vertically elongated loops 221 which receive the bar 25, and which form a slack connection between the springs 220 and the bar 25.

222 (Figs. 13 and 21) represents a number of auxiliary stops, whereby the gear segments, when in their foremost position, are permitted to move downwardly only one space when the auxiliary register is used to count the number of additions which have been made by the main registering mechanism. One of these stops is arranged adjacent to the left hand side of each auxiliary controlling arm and is provided on the upper side of its rear end with a curved guide face which corresponds to and is in line with the upper curved bearing face of the controlling arm when the latter is in its highest position. The several stops 222 are secured with their front ends to a transversely movable slide 223 which is adjustably secured to the underside of the cover 224 of the registering mechanism by a screw 225 passing through a transverse slot 226 in the cover. 227 represents a trip finger secured with its front end to the slide 223 and arranged with its rear end adjacent to the front side of the latch 502 of the primary or unit gear segment. 228 represents an elbow lever arranged below the bottom of the key-board and having its lower arm connected with each of the upper arms of the auxiliary feeling levers 610 by springs 229, as shown in Figures 13 and 16. 230 represents a key having a depending stem which is guided in the top and bottom of the key-board and which bears against the upper arm of the elbow lever 228. During the ordinary adding operation by the auxiliary registering mechanism, the slide 223 is moved toward the left, so that the finger 227 and stops 222 are not in the path of the lugs 490 and latches 501, 502, the springs 229 are loose and do not interfere with the movement of the auxiliary key levers and the springs 220 do not come into use.

When it is desired to count and record consecutively the number of separate additions which are made by the main adding mechanism, the slide 223 is shifted to the right so that its stops 222 stand in the downward path of the stop lugs 490 and latches 501 and 502 of the gear segments and the trip finger 227 stands in the forward path of the latch 502 of the primary or initial gear segment, and the shifting key 230 is depressed, whereby the upper arms of the feeling levers are swung forwardly until their feeling fingers bear against the total cams of the auxiliary dials, these levers together with their companion key levers being yieldingly held in this forward position by the springs 229.

Previous to beginning the consecutive counting and recording of the separate additions of the main registering mechanism, the dials are all turned to zero, in which position all of the upper key lever arms 3701 are in their rearmost position and have their locking shoulders 38 in engagement with the locking lugs 33 of the auxiliary controlling arms, whereby the latter are held in their highest position. Upon moving the rocking segments 15 and 29 forward after depressing the proper keys of the number to be added on the main registering mechanism, the gear segments are all moved forwardly into engagement with their respective dial pinions and the springs 27 of the several gear segments are pulled downward by the bar 25.

During the forward movement of the auxiliary tens and hundreds gear segments their latches 501 engage with their companion controlling arms, which prevents these gear segments from being depressed by the pull of their springs 27, whereby the tens and hundreds dials are not turned. During the forward movement of the primary or units gear segment its latch 502 engages with the trip finger 227 and is turned backwardly out of engagement with the top of its companion controlling arm, thereby releasing the units gear segment and permitting the same to be pulled downwardly by its spring 27, while in engagement with its gear pinion, whereby the units dial is turned. As the auxiliary gear segments move forwardly into engagement with the dial pinions, their lugs 490 move over the stops 222, but in the foremost position of these gear segments their stop lugs 490 are separated from the stops 222 a distance equal to one tooth of the segments or one space on the dials. The instant the latch 502 of the units gear segment is released from the units controlling arm, while the units gear segment is in its foremost position the pull of the springs 27 depresses the units segment until its stop lug 490 engages with the units stop 222, this movement of the units gear segment causing the same to turn the units dial one space or number. During the subsequent backward movement of the rocking segments 15 and 29, the auxiliary gear segments are withdrawn rearwardly from the dial pinions. While in this rearwardly retracted position the units gear segment is raised by the bar 22 and when the same reaches the upper end of this movement the latch 502 is automatically turned over the units controlling arm by the spring 217 of this latch. This operation is repeated and the units dial is turned one space at a time during every adding operation of the main registering mechanism. When the units dial makes one complete rotation, the companion cam 57 releases the units trip arm 54, thereby causing the same to disengage the latch 501 of the auxiliary tens gear segment from the tens controlling arm, whereby the tens gear segment is liberated and permitted to be pulled downward by its spring 27 during the subsequent forward movement of the rocking segments 15 and 29. The tens gear segment moves downwardly until its stop lug 490 engages the adjacent tens stop 222, during which movement the tens gear segment turns the tens dial one space. During the subsequent backward movement of the rocking frames 15 and 29 the tens gear segment is moved backwardly by the springs 11 out of engagement with its dial pinion and upwardly by the bar 22 while in its retracted position at the same time that the units gear segment is retracted and moved upwardly. At the end of the upward movement of the tens gear segment its latch 501 is again turned by its spring into engagement with the tens controlling arm. When the tens gear segment has turned the tens dial one rotation, the auxiliary hundreds gear segment is released by the carrying mechanism between the tens and hundreds registering mechanisms and the hundreds dial is shifted by its gear segment in the same manner as the tens dial.

At the beginning of the counting operation by the auxiliary registering mechanism, the total cams thereof engage with their highest parts against the feeling fingers of the feeling levers whereby the upper arms of the key levers are permitted to occupy their rearmost position with their locking shoulders 38 in engagement with the locking lug 33 of the controlling arms, thereby preventing these arms from being depressed by the pull of their springs 220 upon moving the rocking frames 15 and 29 forwardly. Upon counting the first number on the units dial, the cam 57 thereof, while being shifted with said dial permits the units feeling lever to drop with its feeling finger 62 from the highest to the lowest part of the units total cam, thereby causing the upper arm of the key lever to be moved forwardly by the feeling lever, so that the uppermost stop shoulder 39 of the key lever stands in the path of the stop lug of the units controlling arm. In this position of the parts, the units controlling arm is arrested after being moved downwardly one space by the pull of its spring 27 which is strained by the forward movement of the rocking frames 15 and 29. As the counting on the units dial progresses, the units total cam engages its successively higher parts with the feeling finger of the units feeling lever and moves the same rearwardly one space for each counting operation, and the spring 60 of the units key lever turns the upper arm of the latter backward intermittently in the same measure as the backward movement of the feeling lever permits the same. During every backward step of the upper arm of the units key lever the latter presents a successively lower stop shoulder 39 to the stop lug 34 of the units controlling arm, whereby the latter is permitted to be drawn down by its spring 220 one space farther during every counting operation, although its companion gear segment during this time never moves down more than one space by reason of its stop lug 490 engaging its stop 222, thereby causing its companion printing segment to be shifted to the proper position for printing the number corresponding to its dial. During the upward movement of the units gear segment its controlling arm is also moved upward to its highest position by the rod 22 engaging with the foot 219 of the controlling arm.

When the dial of each register except the highest, has completed one rotation the highest part of its cam has turned the feeling lever backwardly to its fullest extent, and the upper arm of the respective key lever is again engaged with its locking shoulder underneath the locking lug of the respective controlling arm. The loops 221 at the lower end of the lower controlling arm springs 220 are of such length, as to permit the gear segment to descend in advance of the controlling arms and first turn the dials and cams one space and then the rod 25 engages with the lower end of the loops 221 and pulls the controlling arm downwardly, until each is arrested by the proper stop shoulder 39 on the upper arm of its key lever. By thus moving each lower gear segment down in advance of its controlling arm, the respective cam upon turning from 9 to 0 permits the upper arm of the key lever to be shifted rearwardly and moved with its locking shoulder underneath the locking lug of its controlling arm before the latter can descend, thereby holding the controlling arm and the segment in the highest or zero position if the dials while registering move to zero.

When turning the total dials of the auxiliary registering mechanism to zero, the latches 501 and 502 and stop lugs 490 of the auxiliary gear segments are moved downwardly in rear of the stops 222 and the trip finger 227, as the gear segments descend in their rearward position. The auxiliary segments while in their lowered position are now moved forwardly into engagement with their dial pinions. During the subsequent ascent of the gear segments in their forward position the stop lugs 490 and the latches 501 and 502 of the segments deflect the stops 222 and trip finger 227, so as to permit these lugs and latches to be moved above the said stops and fingers preparatory to beginning the next counting operation. The co-operating sides of the lugs 490, laches 501, 502, stops 222 and finger 227 are slightly inclined, as shown in Figures 13 and 21 and are sufficiently elastic to permit these parts to pass each other.

231 is an upright shifting lever, Figure 13, whereby the operation of the printing mechanism of the auxiliary registering mechanism may be controlled. This lever is provided on its upper arm with a cross bar 232 which is arranged in rear of the hammer actuating pawls of the auxiliary printing segments and its lower arm is connected by a wire or cord 233, with a thumb piece 234 which is guided in an opening in the front part of the frame. The lever 231 is turned by a spring 235 in the direction for moving its cross bar forwardly against the auxiliary hammer pawls, thereby holding the same out of engagement with the hammers 147 of the auxiliary printing segments and preventing the same from effecting recording on the impression surface. Upon pulling the thumb piece 234 forwardly, the lever is turned so as to move its cross bar rearwardly away from the auxiliary hammer pawls, thereby permitting the same to engage the hammers of the auxiliary printing segments for recording the numbers corresponding to the auxiliary registering mechanism. The shifting lever is held in its operative or inoperative position by two shoulders 236, 237 arranged one behind the other on the thumb piece and adapted to engage with the edge of the opening in which the thumb piece is guided.

By adjusting the auxiliary registering mechanism so as to count consecutively and throwing its printing mechanism into gear, numbers may be printed consecutively on the impression surface by simply rocking the handle 21 back and forth.

It will be noted that the numbering type in the auxiliary section of the machine can be used to print numbers under the control of the auxiliary numeral keys 401 while at the same time counting is automatically effected on the counter dials 2000. To bring about this result the slide 223 is placed in position to control the auxiliary control arms 3001 for counting the operations of the machine. At each operation in which the auxiliary gear segments are moved forward the finger 227 displaces the latch 502 and causes the addition of a unit in the units counting dial. However, the key 230 being in elevated position, the feeling levers 610 do not engage the cams 57 (of the auxiliary dial wheels), and the stop levers 3601 and 3701 are under the control of the zero stops 33 and the auxiliary numeral keys 401. Thus, when an auxiliary numeral key is depressed its associated lever will be positioned accordingly, and upon the operation of the machine its control arm 3001 and with it the associated type carrier will be positioned in accordance with the value of the key depressed, all as more fully described in connection with the main accumulator. Near the end of the forward stroke of the operating handle the type hammers 147 are operated as heretofore described, printing upon the record sheet the number which has been set up on the auxiliary keys 401 in the same operation in which a unit has been added on the counting dials 2000. Thus, it is possible to print car numbers, folio numbers, or any other identifying number opposite each of the items which is printed on the record and added in the main accumulator while at the same time preserving a count of the number of items added upon the counter dials 2000.

The paper carriage, platen mechanism and line-spacing mechanism may be of any desired and suitable kind; but as the specific details of the preferred mechanism for this purpose forms no part of the invention herein claimed, it has not been described in detail, although the specific structure is shown to some extent in the drawings. The specific carriage and platen mechanism is shown and claimed in another divisional application Serial No. 242,395, filed June 28, 1918; and the same is also shown and described and claimed in various combinations in the various other divisions and in the parent application.

Any suitable inking means may be employed, and the mechanism shown for this purpose is not fully described in this application, as the specific structure is not an essential part of the invention claimed herein. This specific inking mechanism is fully described and claimed in another divisional application Serial No. 254,065, filed September 14, 1918, and eventuating in Patent No. 1,590,024, granted June 22, 1926, to which reference is hereby made.

Any suitable full stroke mechanism may be employed to prevent the operator from making only a partial forward and backward stroke of the rocking frames, 15 and 29, and the mechanism shown for this purpose is not fully described in this application. This specific structure is not an essential part of the invention claimed herein, is fully described in the parent application Serial No. 1,004, now Patent No. 1,429,201, and is described and claimed in various combinations in the divisional applications Serial Nos. 183,397 and 183,398, to which reference is hereby made.

Any suitable mechanism may be provided to hold the keys when they are moved from normal to operative position, and to release the number keys upon operating the operating mechanism, and therefore the mechanism for this purpose is not fully described in this application. This specific mechanism is not an essential part of the invention claimed herein, is fully described in the parent application and patent above identified and is described and claimed in another divisional application, Serial No. 130,583, filed November 10, 1916, to which reference is hereby made.

I claim:

1. In a calculating machine, the combination of a plurality of accumulators, key mechanism for controlling the registrations on said accumulators, and manipulative means for rendering said key mechanism ineffective relatively to certain of said accumulators while such accumulators remain operable for registration.

2. In a calculating machine, the combination of a plurality of sets of accumulators, a separate key mechanism for each of said sets of accumulators and operable to control the registrations thereof, and manipulative means for rendering one of said key mechanisms ineffective relatively to its set of accumulators while the latter remain operable for registration.

3. In a calculating machine, the combination of a plurality of sets of accumulators, a separate key mechanism for each of said sets of accumulators and operable to control the registrations thereof, and manipulative means for rendering one of said key mechanisms ineffective relatively to its set of accumulators while the latter remain operable for registration and without rendering another of said key mechanisms ineffective relatively to its set of accumulators.

4. In a calculating machine, the combination with a plurality of accumulators; a printing device for each of said accumulators for printing the numbers registered thereon; and key mechanism operable to control the numbers registered on said accumulators and printed by said printing devices, the construction and arrangement being such that a set of said accumulators and the associated printing devices may be controlled by said key mechanism during each of a plurality of operations of said machine without affecting or being affected by the remainder of said accumulators and printing devices; of manipulative means whereby the control of a plurality of said printing devices by said key mechanism may be disabled while said printing devices remain operable for printing.

5. In a calculating machine, the combination of a plurality of sets of accumulators, a separate printing device for each set of accumulators for printing the items registered thereon, a separate key mechanism for each of said sets of accumulators and operable to control the registrations thereon and the printing of items by said printing device, and manipulative means whereby the control of one of said printing devices by its key mechanism may be disabled while said printing device remains operable for printing.

6. In a calculating machine, the combination of a plurality of sets of accumulators, a separate printing device for each set of accumulators for printing the items registered thereon, a separate key mechanism for each of said sets of accumulators and operable to control the registrations thereon and the printing of items by said printing device, and manipulative means whereby the control of one of said printing devices by its key mechanism may be disabled while said printing device remains operable for printing under control of its respective set of accumulators.

7. In a calculating machine, the combination of a plurality of sets of accumulators, each of said sets being operable to accumulate a series of items which may be different from those accumulated by another of said sets of accumulators; a plurality of sets of number printing types, one set of number printing types for each of a plurality of said sets of accumulators for printing items accumulated thereon; operating mechanism common to and for effecting accumulating by the accumulators of each of a plurality of said sets of accumulators, and printing by the types of each of a plurality of said sets of number printing types; and means for rendering one of said sets of number printing types inoperable by said operating mechanism to effect printing of items accumulated by its set of accumulators while another of said sets of number printing types remains operable by said operating mechanism for effecting printing of items accumulated on the respective set of accumulators.

8. In a calculating machine, the combination of a plurality of accumulators, printing mechanism, means for causing said printing mechanism to print the digits accumulated by each of said accumulators, and means for modifying the first said means so that it will effect printing by said printing mechanism of the digits accumulated by a portion only of said accumulators.

9. In a calculating machine, the combination of a plurality of sets of accumulators; a plurality of sets of number keys, one set of keys for each set of accumulators of a plurality of said sets of accumulators; number printing types; operating mechanism for causing printing by said types of the items accumulated on said sets of accumulators according to the control of said keys; and manipulative means co-operative with said operating mechanism for causing said types to print the total amount standing on any one of a plurality of said sets of accumulators and under control of such set of accumulators and without causing printing of the total standing on another of said sets of accumulators.

10. In a calculating machine, the combination of a plurality of sets of accumulators, each of said sets of accumulators comprising a plurality of accumulators of successive like denominational orders; a plurality of sets of settable accumulation controlling number keys, one set of keys for each of a plurality of said sets of accumulators, printing mechanism controllable by said number keys for printing items accumulated by each of a plurality of said sets of accumulators; universal operating mechanism for effecting accumulating by each of a plurality of said sets of accumulators and printing by said printing mechanism of items determined by the respective sets of number keys; and a total key mechanism co-operative with said operating mechanism for causing said printing mechanism to print the total accumulated on one of said sets of accumulators and under control of such set of accumulators without printing the total accumulated on another of said sets of accumulators.

11. In a calculating machine, the combination of a plurality of sets of accumulators, each of said sets of accumulators comprising a plurality of accumulators of successive like denominational orders, a plurality of sets of settable accumulation controlling number keys, one set of keys for each of a plurality of said sets of accumulators, printing mechanism controllable by said number keys for printing items accumulated by each of a plurality of said sets of accumulators; universal operating mechanism for effecting accumulating by each of a plurality of said sets of accumulators and printing by said printing mechanism of items determined by the respective sets of number keys; and the total key mechanism co-operative with said operating mechanism for causing said printing mechanism to print the total accumulated on one of said sets of accumulators and under control of said set of accumulators without printing the total accumulated on another of said sets of accumulators, and to clear the set of accumulators from which said total is printed and at the same operation of said operating mechanism during which said total is printed and without clearing another of said sets of accumulators.

12. In a calculating machine, the combination of a plurality of sets of accumulators, each of said sets of accumulators comprising a plurality of accumulators of successive like denominational orders, a plurality of settable accumulation controlling sets of number keys, universal operating mechanism for effecting accumulating by each of a plurality of said sets of accumulators according to the control of the respective sets of number keys; and means for turning one of said sets of accumulators to zero without effecting turning of another of said sets of accumulators to zero.

13. In a calculating machine, the combination of a plurality of accumulators, a plurality of sets of number types one set of number types for each of a plurality of said accumulators for printing items accumulated thereon, a plurality of rows of controlling keys one row of keys for each of a plurality of said accumulators and associated sets of types for controlling items to be accumulated and printed thereby, operating mechanism common to and for operating said accumulators and sets of types, and means for rendering said operating mechanism ineffective to cause certain of said accumulators to accumulate numbers printed by their corresponding number types and without rendering said operating mechanism ineffective to cause other of said accumulators to accumulate the numbers printed by their corresponding number types.

14. In a calculating machine, the combination of a plurality of accumulators, a plurality of sets of number types one set of number types for each of a plurality of said accumulators for printing items accumulated thereon, a plurality of rows of controlling keys one row of keys for each of a plurality of said accumulators and associated sets of types for controlling items to be accumulated and printed thereby, operating mechanism common to and for operating said accumulators and sets of types, means for rendering said operating mechanism ineffective with relation to certain of said accumulators and means for rendering said operating mechanism ineffective with relation to all of said accumulators at the will of the operator.

15. In a calculating machine, the combination with a plurality of accumulators, printing mechanism correlated therewith, a manipulative member, and a plurality of variably positionable members which may be positioned according to the amount on said accumulators by the manipulation of said manipulative member, for thereby controlling said printing mechanism to effect printing of said amount which is on said accumulators.

16. In a calculating machine, the combination of a plurality of accumulators or successive denominational orders operable to accumulate items, a plurality of actuating members for differentially actuating said accumulators, a plurality of stops for controlling the extent of movement of said actuators, a plurality of manipulative members for controlling said stops, operating mechanism for operating said actuators according to the control of said stops as determined by said manipulative members, and means operable for rendering said stops ineffective with relation to said actuators and for automatically effecting a predetermined accumulation by said accumulators at each of a plurality of operations of said operating mechanism.

17. In a calculating machine, the combination of a set of accumulators, a plurality of actuators for said accumulators, manipulative elements for controlling the extent of actuation of said actuators, operating mechanism for operating said actuators according to the control of said manipulative elements, and mechanism for rendering the control of said manipulative elements ineffective and for causing said actuators to add one unit of the lowest denomination on said set of accumulators at each of a plurality of operations of said operating mechanism, thereby counting the number of operations of said operating mechanism in a series of operations thereof.

18. In a calculating mechanism, the combination of a set of accumulator gear pinions, actuating racks therefor, manipulative means whereby the operation of each of said actuating racks may be controlled to effect accumulating of any amount from one to nine at an operation, operating mechanism for effecting engagement and disengagement of said racks and pinions and for causing said racks to actuate said pinions according to the control of said manipulative means, and a second manipulative means whereby the character of said calculating mechanism may be changed from accumulating various items to counting operations and whereby the engagement of said rack and pinion may be utilized to effect control of said actuator to perform counting on said accumulator gear pinion.

19. In a calculating machine, the combination of a set of accumulators, a plurality of actuators for said accumulators, manipulative elements for controlling the extent of actuation of said actuators, operating mechanism for operating said actuators according to the control of said manipulative elements, mechanism for rendering the control of said manipulative elements ineffective and for causing said actuators to add one unit of the lowest denomination on said set of accumulators at each of a plurality of operations of said operating mechanism, thereby counting the number of operations of said operating mechanism in a series of operations thereof, and a manipulative element whereby said mechanism may be rendered effective and ineffective.

20. In a calculating machine, the combination of a plurality of accumulators of successive denominational orders and operable to accumulate items, a plurality of numeral types operable to print items accumulated on said accumulators, a plurality of manipulative members for determining the items to be accumulated by said accumulators and printed by said numeral types, universal operating mechanism for operating said accumulators and types according to the control of said manipulative members and mechanism whereby said accumulators may be rendered ineffective to accumulate according to the control of said manipulative members while said numeral types remain effective to print items according to the control of said manipulative members, said mechanism being co-operative with said operating mechanism for causing said accumulators to count the number of items of a plurality of items printed by said numeral types.

21. In a calculating machine, the combination of a plurality of accumulators of successive denominational orders and operable to accumulate items, a plurality of numeral types operable to print items accumulated on said accumulators, a plurality of manipulative members for determining the items to be accumulated by said accumulators and printed by said numeral types, universal operating mechanism for operating said accumulators and types according to the control of said manipulative members, mechanism whereby said accumulators may be rendered ineffective to accumulate according to the control of said manipulative members while said numeral types remain effective to print items according to the control of said manipulative members, said mechanism being co-operative with said operating mechanism for causing said accumulators to count the number of items of a plurality of items printed by said numeral types, and a total key co-operative with said operating mechanism for effecting printing by said numeral types of the total number of items counted by said accumulators and under control of said accumulators.

22. In a calculating machine, the combination of a plurality of sets of accumulators, each of said sets being operable to accumulate a series of items which may be different from the items accumulated by another of said sets; universal operating mechanism for operating a plurality of said sets of accumulators to accumulate items; and means co-operative with one of said sets of accumulators and with said operating mechanism for causing such set of accumulators to count the number of items in a plurality of items accumulated on another of said sets of accumulators.

23. In a calculating machine, the combination of a plurality of sets of accumulators, each of said sets being operable to accumulate a series of items which may be different from the items accumulated by another of said sets; printing mechanism for printing items accumulated on each of a plurality of said sets of accumulators; manipulative means for determining items to be accumulated by each of a plurality of said sets of accumulators and printed by said printing mechanism; universal operating mechanism for operating a plurality of said sets of accumulators and said printing mechanism according to the control of said manipulative means; means co-operative with said operating mechanism for automatically causing one of said sets of accumulators to count the number of items in a plurality of items accumulated by another of said sets of accumulators; and a device co-operative with said operating mechanism to cause said printing mechanism to simultaneously print the totals standing on a plurality of said sets of accumulators.

24. In a calculating machine, the combination of a plurality of sets of accumulators, each of said sets being operable to accumulate a series of items which may be different from the items accumulated by another of said sets; printing mechanism for printing items accumulated on each of a plurality of said sets of accumulators; manipulative means for determining items to be accumulated by each of a plurality of said sets of accumulators and printed by said printing mechanism; universal operating mechanism for operating a plurality of said sets of accumulators and said printing mechanism according to the control of said manipulative means; means co-operative with said operating mechanism for automatically causing one of said sets of accumulators to count the number of items in a plurality of items accumulated by another of said sets of accumulators; a device co-operative with said operating mechanism to cause said printing mechanism to simultaneously print the totals standing on a plurality of said sets of accumulators; and means for rendering said printing mechanism ineffective with relation to one of said sets of accumulators.

25. In a calculating machine, the combination of a plurality of sets of accumulators, each of said sets being operable to accumulate a series of items which may be different from the items accumulated by another of said sets; a plurality of printing mechanisms, operable to print items accumulated on the respective sets of accumulators; a plurality of manipulative members for determining items to be accumulated by each of a plurality of said sets of accumulators and printed by the respective printing mechanism; universal operating means for operating a plurality of said sets of accumulators and printing mechanisms according to the control of said manipulative members; and controlling mechanism whereby one of said sets of accumulators may be rendered ineffective to accumulate according to the control of said manipulative members while the corresponding printing mechanism and another of said sets of accumulators and the printing mechanism corresponding thereto remain effective to be operated according to the control of said manipulative members, said controlling mechanism being co-operative with said operating means for causing the set of accumulators which has been rendered ineffective, to count the number of items of a plurality of items printed by its corresponding printing mechanism.

26. In a calculating machine, the combination of a plurality of sets of accumulators, each of said sets being operable to accumulate a series of items which may be different from the items accumulated by another of said sets; a plurality of printing mechanisms, one printing mechanism for each set of accumulators of a plurality of said sets of accumulators and operable to print items accumulated on the respective set of accumulators; a plurality of manipulative members for determining items to be accumulated by each of a plurality of said sets of accumulators and printed by the respective printing mechanism; universal operating means for operating a plurality of said sets of accumulators and printing mechanisms according to the control of said manipulative members; controlling mechanism whereby one of said sets of accumulators may be rendered ineffective to accumulate according to the control of said manipulative members while the corresponding printing mechanism and another of said sets of accumulators and the printing mechanism corresponding thereto remain effective to be operated according to the control of said manipulative members, said controlling mechanism being co-operative with said operating means for causing the set of accumulators which has been rendered ineffective to count the number of items of a plurality of items printed by its corresponding printing mechanism; and a total key co-operative with said operating mechanism for effecting at a single operation of the latter printing by the respective printing mechanisms of the total counted by the last mentioned set of accumulators and the total accumulated by another of said sets of accumulators, the set of accumulators which have been counting being automatically rendered ineffective to count said total taking operation.

27. The combination of a plurality of printing types operable to print items, a plurality of manipulative members for determining items to be printed by said printing types, operating mechanism for operating said printing types according to the control of said manipulative members, and means for removing said types from the control of said manipulative members, and automatically controlling said types to print consecutive numbers at consecutive operations of said operating mechanism.

28. The combination of a plurality of printing types operable to print items, a plurality of stops for determining items to be printed by said printing types, a plurality of manipulative members for controlling said stops, operating mechanism for operating said printing types according to the control of said stops as determined by said manipulative members, and means for removing said stops from the control of said manipulative members and automatically controlling said stops for causing said printing types to print consecutive numbers at consecutive operations of said operating mechanism.

29. The combination of a plurality of type-carrying members, a set of types mounted on each of said type-carrying members and each set of types comprising a plurality of integer types and a zero type, manipulative means for controlling the movement of said type-carrying members to position said integer types in printing relation to a record material, operating mechanism for operating said type-carrying members to position said integer types under control of said manipulative means and for effecting at a single operation printing by a plurality of said types when so positioned, means whereby the positioning of one of the integer types of any of said sets of types in printing relation with said record material renders said operating mechanism operable for effecting printing by the zero type of each of said sets of types which are to the right of the positioned integer type unless such sets of types are themselves moved for printing integers, and means for removing said type-carrying members from the control of said manipulative members and causing the types thereof to automatically print consecutive numbers at consecutive operations of said operating mechanism.

30. In a calculating machine, the combination of a plurality of accumulators operable to accumulate items, a plurality of printing types for printing items accumulated on said accumulators, manipulative means for controlling the items to be accumulated by said accumulators and printed by said types, operating mechanism for operating said accumulators and types according to the control of said manipulative members, mechanism for removing said types from the control of said manipulative members and automatically controlling said printing types to print successive numbers at successive operations of said operating mechanism, and a manipulative member co-operative with said operating mechanism for causing said numeral types to print on a record material the total registered on said accumulators.

31. In a calculating machine, the combination of a plurality of accumulators, a plurality of actuators for said accumulators, a plurality of types for printing items registered by said accumulators, controlling members for said types, operating mechanism common to and for actuating said actuators and said controlling members, the construction and arrangement being such that said controlling members may move with said actuators for printing and accumulating an item at a single operation of said operating mechanism or may move independently of said actuators for effecting printing of one number and accumulating of a different number at a single operation of said operating mechanism.

32. In a calculating machine, the combination of a plurality of accumulators, printing mechanism for printing items accumulated on said accumulators, manipulative means for determining items to be accumulated on said accumulators and printed by said printing mechanism, operating mechanism for operating said accumulators and printing mechanism according to the control of said manipulative means, and means for removing said accumulators and printing mechanism from the control of said manipulative means and co-operative with said operating mechanism for causing said accumulators to count and said printing mechanism to print the consecutive numbers of the consecutive operations of said operating mechanism.

33. In a calculating machine, the combination of a plurality of accumulators, printing mechanism for printing items accumulated on said accumulators, manipulative means for determining items to be accumulated on said accumulators and printed by said printing mechanism, operating mechanism for operating said accumulators and printing mechanism according to the control of said manipulative means, means for removing said accumulators and printing mechanism from the control of said manipulative means and co-operative with said operating mechanism for causing said accumulators to count and said printing mechanism to print the consecutive numbers of the consecutive operations of said operating mechanism, and a device co-operative with said operating mechanism for causing said printing mechanism to print the total counted by said accumulators and without counting the total printing operation of said operating mechanism.

34. In a calculating machine, the combination of an accumulator, an actuating rack therefor, a plurality of types for printing what is accumulated on said accumulator, a type-carrying member carrying said types and movable for positioning said types to effect printing by desired ones thereof, operating mechanism for operating said rack and said type-carrying member and effecting printing by the type positioned by said type-carrying member, and means co-operative with said operating mechanism for causing said rack to make a one-step movement at each operation of a plurality of operations of said operating mechanism for effecting counting and for causing said type-carrying member to move various amounts at such operations for positioning said types for printing according to the number registered on said accumulator at each operation of said plurality of operations.

35. In a calculating machine, the combination of a plurality of accumulators for accumulating items, a plurality of stops for controlling the items accumulated by said accumulators, a plurality of manipulative members for controlling said stops, printing mechanism controllable by said stops for printing items accumulated by said accumulators, operating mechanism for operating said accumulators and said printing mechanism according to the control of said stops as determined by said manipulative members, and mechanism for removing said accumulators from the control of said stops and for removing said stops from the control of said manipulative members and putting said stops under the control of said accumulators.

36. In a calculating machine, the combination of a plurality of accumulators, printing mechanism for printing items accumulated on said accumulators, manipulative means for determining items to be accumulated on said accumulators and printed by said printing mechanism, operating mechanism for operating said accumulators and printing mechanism according to the control of said manipulative means, means for removing said accumulators and printing mechanism from the control of said manipulative means and co-operative with said operating mechanism for causing said accumulators to count and said printing mechanism to print the consecutive numbers of the consecutive operations of said operating mechanism, and a device operable to render said operating mechanism ineffective with relation to said printing mechanism.

37. In a calculating machine, the combination of a plurality of sets of accumulators, each of said sets of accumulators being operable to accumulate a series of items which may be different from items accumulated by another of said sets of accumulators; a plurality of printing mechanisms, one printing mechanism for each set of a plurality of said sets of accumulators for printing items accumulated thereon; manipulative means for determining items to be accumulated on said sets of accumulators and printed by said printing mechanisms; operating mechanism for operating a plurality of said sets of accumulators and the corresponding printing mechanisms according to the control of said manipulative means; and means for removing one of said sets of accumulators and its respective printing mechanism from the control of said manipulative means, and co-operative with said operating mechanism for causing such set of accumulators to count and the respective printing mechanism to print the consecutive numbers of consecutive items accumulated and printed by another of said sets of accumulators and its respective printing mechanism.

38. In a calculating machine, the combination of a plurality of sets of accumulators, each of said sets of accumulators being operable to accumulate a series of items which may be different from items accumulated by another of said sets of accumulators; a plurality of printing mechanisms, one printing mechanism for each set of a plurality of said sets of accumulators for printing items accumulated thereon; manipulative means for determining items to be accumulated on said sets of accumulators and printed by said printing mechanisms; operating mechanism for operating a plurality of said sets of accumulators and the corresponding printing mechanisms according to the control of said manipulative means; means for removing one of said sets of accumulators and its respective printing mechanism from the control of said manipulative means, and co-operative with said operating mechanism for causing such set of accumulators to count and the respective printing mechanism to print the consecutive numbers of consecutive items accumulated and printed by another of said sets of accumulators and its respective printing mechanism; and a device co-operative with said operating mechanism for causing the respective printing mechanisms to print the total number counted by the set of accumulators counting items and the total amount accumulated by the set of accumulators accumulating the items counted.

39. In a calculating machine, the combination of a plurality of sets of accumulators, each of said sets of accumulators being operable to accumulate a series of items which may be different from items accumulated by another of said sets of accumulators; a plurality of printing mechanisms, one printing mechanism for each set of a plurality of said sets of accumulators for printing items accumulated thereon; manipulative means for determining items to be accumulated on said sets of accumulators and printed by said printing mechanisms; operating mechanism for operating a plurality of said sets of accumulators and the corresponding printing mechanisms according to the control of said manipulative means; means for removing one of said sets of accumulators and its respective printing mechanism from the control of said manipulative means, and co-operative with said operating mechanism for causing such set of accumulators to count and the respective printing mechanism to print the consecutive numbers of consecutive items accumulated and printed by another of said sets of accumulators and its respective printing mechanism; and a device for rendering said operating mechanism ineffective with relation to one of said printing mechanisms.

40. In an adding and listing machine, the combination with means for setting up, accumulating and printing successive amounts; of consecutive numbering means comprising setting up, accumulating and printing devices whereby a basic number may be registered and recorded, devices for successively adding a unit to said basic number registration as amounts are successively registered and recorded, and devices for successively recording such increased registration in connection with the recording of amounts.

41. In an adding machine, a series of type-carriers operable side by side effectively to record a number of columns of items at a single operation, racks, devices connecting said racks and type-carriers, means for disconnecting said racks from said type-carriers, and adding mechanism operable automatically to add the items recorded in one of said columns, substantially as described.

42. In an adding machine, a series of type-carriers operable side by side effectively to record numbers, adding mechanism, racks, means for operating said racks effectively to cause said adding mechanism to add the numbers recorded, and means for preventing said racks from operating when numbers are recorded, substantially as described.

43. In combination with a machine for recording a series of individual items and recording the total thereof on a paper strip, of means for co-operating with the recording mechanism for consecutively numbering said items in conjunction with the recording of an item, comprising setting-up and printing mechanism automatically controlled by the operation of the operative parts of the machine in recording each item, operative connection between the recording mechanism and printing mechanism, and manual means for releasing said connection and thereby preventing the operation of said number printing mechanism at will.

44. In an adding machine, printing mechanism and operating means therefor, in combination with numbering mechanism for each individual item, printing mechanism therefor, intermediate mechanism between the main printing mechanism and the numbering printing mechanism, whereby the numbering mechanism is automatically advanced one step at each operation of the printing mechanism and the character indicating the number of the operation is also printed whenever the printing mechanism is operated, and means whereby the numbering printing mechanism is inoperative except when actuated by the main printing mechanism.

45. An adding and recording machine, comprising a series of type-carriers arranged in numerical orders, adding wheels arranged in numerical orders, and automatic means for operating said adding wheels when numbers are recorded, in combination with means for enabling all of said type-carriers to operate independently of the adding mechanism, and means for enabling certain of said type-carriers to operate independently of the adding mechanism at the same time that other type-carriers and corresponding portions of the adding mechanism operate in recording and adding operations.

46. In an adding machine, the combination with recording mechanism, and adding mechanism, of actuators connected with said recording mechanism for operating said adding mechanism, and means for disconnecting said actuators from said recording mechanism.

47. In an adding machine, a series of type-carriers, a series of racks, a series of adding wheels under control of said racks, and means for operating said type-carriers jointly with or independently of said racks at the will of the operator.

48. In an adding machine, a series of type-carriers, a series of racks, a series of adding wheels under control of said racks, and means for enabling a varying number of said type-carriers to operate independently of said racks at the will of the operator.

49. In an adding machine of the multiple key bank type, the combination, with the adding and printing mechanisms thereof, of means for rendering the same inoperative as to a predetermined number of the rows or banks of keys; substantially as described.

50. In an adding machine, an accumulator, printing mechanism, means for putting a number into a section of the accumulator, means for printing said number, and means for simultaneously printing another number excluded from the accumulator section normally capable of receiving it.

51. In an adding machine, the combination with a set of wheels adapted to display accumulations of various amounts, and means for differentially turning said wheels; of one or more wheels in line therewith adapted to display alongside the accumulation an amount representing the number of times the first mentioned wheels have been operated to produce such accumulation, and means for turning said counting wheel one step in each accumulating operation of the first mentioned wheels, and means for automatically rendering said turning means effective as an incident to such accumulating operation.

52. In an adding machine, the combination with devices for accumulating various amounts and clearing mechanism; of a counter for showing the number of operations of said devices in effecting an accumulation, means released by said devices for operating said counter, and means for taking an imprint of the count at will under control of the clearing mechanism.

53. In an adding machine, the combination, with the accumulating, printing and totalizing mechanisms thereof, of means for accumulating and visually indicating the number of items listed, the said means being under the control of the totalizing mechanism of the machine as to printing action, and under control of the accumulating mechanism as to counting action.

54. In an adding machine, the combination, with the accumulating, printing and totalizing mechanisms thereof, of means for accumulating and visually indicating the number of items listed and including a printing device controlled by said totalizing mechanism and arranged to print a total of the number of items whenever a total of the items is printed by said printing mechanism, said means under control of the accumulating mechanism as to counting action.

55. In an adding machine, the combination, with the accumulating, printing and totalizing mechanisms thereof, of means for accumulating the number of items listed and including visual indicating wheels and a printing device controlled by said totalizing mechanism and arranged to print a total of the number of the items at one side of total of the items as printed by said printing mechanism, said means under control of the accumulating mechanism as to counting action.

56. In a machine of the class described, the combination with operating mechanism, of differential devices, a series of manipulative devices constructed to be selectively set by the operator to control the differential devices in certain operations of the machine and movable by the operating mechanism from one controlling position to the other in other operations of the machine.

57. In a machine of the class described, the combination with differential devices, of a plurality of devices manually adjustable to control the setting of the differential devices in certain operations of the machine, and means for automatically shifting the manually adjustable devices to alter the setting of the differential devices in other operations of the machine.

58. In a calculating machine, a keyboard, a series of accumulators controllable from said keyboard, actuating devices for said accumulators, and means to release said actuating devices from said keyboard control and automatically trip one of the actuating devices, to thereby effect item counting on a selected one of said accumulators, during an operation of the machine.

59. In a calculating machine, the combination of a plurality of sets of accumulators, each of said sets being operable to accumulate a series of items which may be different from those accumulated by another of said sets of accumulators; a plurality of sets of number printing types, one set of number printing types for each of a plurality of said sets of accumulators for printing items accumulated thereon; operating mechanism common to and for effecting accumulating by the accumulators of each of a plurality of said sets of accumulators, and printing by the types of each of a plurality of said sets of number printing types; and means for rendering one of said sets of number printing types inoperable by said operating mechanism to effect printing while another of said sets of number printing types remain operable by said operating mechanism for effecting printing of items accumulated on the respective set of accumulators.

60. In a calculating machine, the combination of a plurality of accumulators, printing mechanism, means for causing said printing mechanism to print the digits accumulated by each of said accumulators, and means for modifying the first said means so that it will effect printing by said printing mechanism of the digits accumulated by a portion only of said accumulators and for rendering the first said means incapable of causing said printing mechanism to print digits correlated with other of said accumulators.

WILLIAM S. GUBELMANN.